US008094244B2

(12) United States Patent
Sawai et al.

(10) Patent No.: US 8,094,244 B2
(45) Date of Patent: *Jan. 10, 2012

(54) DISPLAY SCREEN TURNING APPARATUS

(75) Inventors: Kunio Sawai, Daito (JP); Katsuyuki Yokota, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1076 days.

This patent is subject to a terminal disclaimer.

(21) Appl. No.: 11/924,886

(22) Filed: Oct. 26, 2007

(65) Prior Publication Data

US 2008/0099652 A1    May 1, 2008

(30) Foreign Application Priority Data

Oct. 27, 2006 (JP) ................................ 2006-291979

(51) Int. Cl.
 *H04N 5/64* (2006.01)
(52) U.S. Cl. ..................... 348/836; 248/919; 361/679.22
(58) Field of Classification Search ............. 348/333.06, 348/825, 827, 831, 836–842; 248/419, 425, 248/521, 130, 131, 458, 917, 146, 919; 361/697.06, 361/697.01, 807, 697.22, 697.21; 74/422, 74/425, 412 R, 412 TA, 827, 434, 473.1
See application file for complete search history.

(56) References Cited

U.S. PATENT DOCUMENTS

| 4,770,382 A * | 9/1988 | Lehti ......................... 248/181.2 |
| 6,801,426 B2 * | 10/2004 | Ichimura .................. 361/679.06 |
| 6,954,221 B2 * | 10/2005 | Wu ........................... 361/679.21 |
| 7,869,203 B2 * | 1/2011 | Sawai et al. .............. 361/679.22 |
| 2002/0053629 A1 * | 5/2002 | Hokugoh ...................... 248/371 |
| 2006/0124818 A1 * | 6/2006 | Wai ............................ 248/349.1 |
| 2007/0221810 A1 * | 9/2007 | Liao .............................. 248/425 |
| 2008/0049390 A1 | 2/2008 | Sawai et al. |
| 2009/0031926 A1 | 2/2009 | Goda |

FOREIGN PATENT DOCUMENTS

| EP | 1 892 454 A1 | 2/2008 |
| JP | 50-137471 | 10/1975 |
| JP | 9-26754 A | 1/1997 |
| JP | 2748495 B2 | 2/1998 |
| JP | 11-280992 A | 10/1999 |
| JP | 2004-31714 A | 1/2004 |
| WO | WO 2006/092834 A1 | 9/2006 |

OTHER PUBLICATIONS

The Extended European Search Report dated May 19, 2010 (Seven (7) pages).

* cited by examiner

*Primary Examiner* — William V Gilbert
*Assistant Examiner* — Theodore Adamos
(74) *Attorney, Agent, or Firm* — Crowell & Moring LLP

(57) ABSTRACT

A display screen turning apparatus capable of improving assembling workability and suppressing jolting at a time of rotation is obtained. This display screen turning apparatus includes a rotating member mounted with a display screen portion and rotatable in a horizontal plane, a base provided with an upright portion rotatably holding the rotating member and having a first hole, a regulating member so mounted on the upright portion of the base as to prevent the rotating member from moving upward, and a stop member formed in a tapered shape by end surface portions, and holding a state where the regulating member is in contact with the rotating member by inserting the stop member into the first hole of the upright portion of the base and pressing the regulating member.

15 Claims, 10 Drawing Sheets

DISPLAY SCREEN TURNING APPARATUS

BACKGROUND OF THE INVENTION

1. Field of the Invention

The present invention relates to a display screen turning apparatus, and more particularly, it relates to a display screen turning apparatus comprising a rotating member mounted with a display screen portion and rotatable in a horizontal plane.

2. Description of the Background Art

A display screen turning apparatus comprising a rotating member mounted with a display screen portion and rotatable in a horizontal plane is know in general, as disclosed in Japanese Patent Laying-Open No. 2004-31714, Japanese Patent Registration No. 2748495 and Japanese Patent Laying-Open No. 11-280992 (1999).

The aforementioned Japanese Patent Laying-Open No. 2004-31714 discloses a display screen turning apparatus (turntable for apparatus) comprises a fixed base to be grounded, a circular movable base placed with an apparatus (small-sized computer, etc.) on an upper portion, and a plurality of guide members guiding a rotating operation of the movable base. In this display screen turning apparatus (turntable for apparatus), a first end of the guide member is mounted on the fixed base with a plurality of bolts through a fitting bracket and a second end of the guide member comes into contact with a ring-shaped flange provided on an edge of the movable base so that the movable base is rotatably pressed in the horizontal direction.

The aforementioned Japanese Patent Registration No. 2748495 discloses a display screen turning apparatus (display support apparatus) comprising a base portion integrally formed with a boss extending upward from a center of a recess portion having prescribed spherical shape, a slider portion integrally provided with a rectangular guide hole in a center of a projecting portion having the substantially same radius of curvature as the base portion, and a ring-shaped stop member (spacer) having a hole formed in the substantially same shape as a section of the boss of the base portion. In this display screen turning apparatus (display support apparatus), a stop member (spacer) is fitted onto a forward end of the boss of the base portion passing through the guide hole of the slider portion and protruding upward in a state where the recess portion of the base portion and the projecting portion of the slider portion come into contact with each other, so that the stop member is engaged with a plurality of elastically deformable pawl portions provided on the forward end of the boss to be fixed, and the slider portion is rotated on the base portion from right to left or up and down in a state of being press-bonded to the base portion.

The aforementioned Japanese Patent Laying-Open No. 11-280992 discloses a display screen turning apparatus (table stand apparatus) comprising a base plate horizontally rotatably provided with a shaft with a screw groove extending upward in a center thereof, a ring-shaped upper disc plate spring, a circular plate provided with a support member for supporting a monitor or the like on an upper surface, and a substantially star-shaped tightening nut. In this display screen turning apparatus (table stand apparatus), an operator inserts the upper disc plate spring and the plate around the shaft and tightens the tightening nut to the shaft so that the plate is rotated on the base plate in the horizontal direction through the upper disc plate spring.

In the conventional display screen turning apparatus (turntable for apparatus) proposed in the aforementioned Japanese Patent Laying-Open No. 2004-31714, however, the plurality of guide members coming into contact with the flange of the movable base for pressing the same are mounted on the fixed base with the plurality of bolts, and hence pressure contact force with respect to the flange of the guide members conceivably varies in a case where size accuracy in manufacturing the guide members is low or the tightening force of the bolts varies according to guide members. Therefore, in the guide portion having relatively small pressure contact force, a clearance may occur between the guide portion and the flange of the movable base, and hence the movable base may disadvantageously jolt.

In the conventional display screen turning apparatus (display support apparatus) proposed in the aforementioned Japanese Patent Registration No. 2748495, the stop member (spacer) is engaged with the elastically deformable pawl portions provided on the forward end of the boss, and hence the stop member (spacer) conceivably partially slips off from the pawl portions and an engaging state with the boss is conceivably partially unstable, in a case where abrupt external force is applied to the display screen portion (display body) in a state where the display screen portion (display body) including metal components is placed on the slider portion. Thus, the stop member (spacer) can not reliably press-bond the slider portion (rotating member) to the base portion (base), and the slider portion (rotating member) may disadvantageously jolt.

In the conventional display screen turning apparatus (table stand apparatus) proposed in the aforementioned Japanese Patent Laying-Open No. 11-280992, the plate conceivably is conceivably assembled by meshing the tightening nut with the shaft for deflecting the upper disc plate spring so that the plate receives prescribed pressure contact force from the base, to require a step of controlling the pressure contact force (shrinkage of the upper disc plate spring). Thus, the assembling operation is so complicated that it is difficult to improve assembling workability.

SUMMARY OF THE INVENTION

The present invention has been proposed in order to solve the aforementioned problems, and an object of the present invention is to provide a display screen turning apparatus capable of improving assembling workability and suppressing jolting at a time of rotation.

A display screen turning apparatus according to a first aspect of the present invention comprises a rotating member mounted with a display screen portion and rotatable in a horizontal plane, a base provided with an upright portion rotatably holding the rotating member and having a first hole, a regulating member so mounted on the upright portion of the base as to prevent the rotating member from moving upward, and a stop member formed in a tapered shape by end surface portions, and holding a state where the regulating member is in contact with the rotating member by inserting the stop member into the first hole of the upright portion of the base and pressing the regulating member.

As hereinabove described, the display screen turning apparatus according to the first aspect of the present invention comprises the stop member formed in the tapered shape by the end surface portions, and inserted into the first hole of the upright portion of the base and holding the regulating member by press, whereby an operator simply inserts the stop member formed in the tapered shape so as to produce prescribed pressing force with respect to the regulating member into the first hole of the upright portion of the base when mounting the rotating member on the base. Thus, assembling workability of the operator can be improved. The display screen turning apparatus comprises the regulating member so mounted on the upright portion of the base rotatably holding the rotating member as to prevent the rotating member from moving upward and the stop member formed in the tapered shape by the end surface portions, and holding a state where the regulating member is in contact with the rotating member by inserting the stop member into the first hole of the upright portion of the base and pressing the regulating member, whereby the regulating member is held with the stop member while being always in contact with the rotating member, and hence no clearance occurs on the contact portion between the regulating member and the rotating member. Therefore, jolting of the rotating member can be suppressed.

In the aforementioned display screen turning apparatus according to the first aspect, the base is preferably made of sheet metal and the upright portion of the base is preferably formed integrally with the base by partially uprighting the base. According to this structure, the upright portion can easily be formed at the same time when the base of sheet metal is formed by press working, and the number of components can be inhibited from increase even when the upright portion is provided. Additionally no step is required for mounting the upright portion manufactured as an individual component on the base, whereby the assembling workability can be further improved.

In this case, a side end surface portion in a thickness direction of the upright portion formed by partially uprighting the base made of sheet metal preferably comes into contact with an outer peripheral surface of the rotating member. According to this structure, the outer peripheral surface of the rotating member comes into contact with, not a cut surface, but a smooth sheet metal surface (end surface portion having small surface roughness in a thickness direction of sheet metal) dissimilarly to a case of coming into contact with the cut surface formed when partially cutting the upright portion from the base (end surface portion having large surface roughness in a direction perpendicular to the thickness direction of sheet metal), and hence the rotating member is inhibited from rotating while the rotational axis (rotation center) is decentered in the horizontal direction. Therefore, the rotating member can smoothly rotate on the base.

In this case, a plurality of the upright portions of the base are preferably provided so as to surround the outer peripheral surface of the rotating member so that movement of the rotating member in a horizontal direction can be regulated. According to this structure, the rotating member can be inhibited from rotating in a state where the rotational axis is decentered in the horizontal direction when rotating on the upper surface of the base.

In the aforementioned structure in which the side end surface portion in the thickness direction of the upright portion comes into contact with the outer peripheral surface of the rotating member, a plurality of the upright portions of the base are preferably provided along the outer peripheral surface of the rotating member at substantially equal angular intervals in a plan view. According to this structure, the rotating member is rotatably held in the vicinity of the upright portion of the base circumferentially provided at equal angular intervals from the rotation center with uniform pressing force by the regulating member and hence the rotational torque of the rotating member can be inhibited from dispersion.

The aforementioned display screen turning apparatus according to the first aspect preferably further comprises a plurality of slide members formed in a sphere and arranged inside an outer peripheral surface of the rotating member at prescribed intervals, wherein the upright portion of the base is preferably uprighted from the base toward a rotational center point of the rotating member, and an opening formed in the base by partially uprighting is located outside the outer peripheral surface of the rotating member. According to this structure, the spherical slide members arranged inside the rotating member are never overlapped with the opening of the base. Therefore, the spherical slide members can be inhibited from dropping from the opening of the base.

In the aforementioned display screen turning apparatus according to the first aspect, the regulating member preferably has a L-shaped longitudinal section by a first surface provided with a first contact portion coming into contact with the rotating member and a second surface provided with a projecting portion, and the base preferably further has a second hole receiving the projecting portion of the regulating member and serving as a supporting point rotatably supporting the regulating member in a vertical direction. According to this structure, the first surface of the regulating member rotates in the vertical direction about the projecting portion inserted into the second hole of the base when the stop member is inserted into the upright portion of the base for bringing the regulating member into contact with the rotating member, whereby the regulating member can be easily brought into contact with the rotating member without jolting.

In this case, the first contact portion of the regulating member is preferably so formed on the first surface as to protrude toward an upper surface of the rotating member. According to this structure, only the first contact portion formed on the first surface is in contact with the upper surface of the rotating member when the first surface of the regulating member rotates toward the rotating member with the stop member and hence the rotating member can be stably rotated on the base while receiving frictional force properly controlled according to the size (contact area) of the first contact portion of the regulating member dissimilarly to a case where the first surface is entirely in contact with the upper surface of the rotating member, for example.

In the aforementioned structure in which the base further has the second hole, the regulating member preferably further has a second contact portion provided on an end of the second surface and coming into contact with an upper surface of the base when the projecting portion of the regulating member is inserted into the second hole of the base. According to this structure, the second contact portion of the end of the second surface provided with the projecting portion and the upper surface of the base come into contact with each other when inserting the projecting portion of the regulating member into the second hole of the base respectively so that the projecting portion is inserted into the second hole by a prescribed depth. Therefore, positioning in the vertical direction can be easily performed when mounting the regulating member on the base through the second hole. At this time, the regulating member is rotatably supported on the base with not only the projecting portion but also the second contact portion, and hence rotation of the regulating member by the stop member can be stably performed.

In the aforementioned display screen turning apparatus according to the first aspect, the stop member is preferably in the form of a plate and preferably receives pressing force of the regulating member with the end surface portions perpendicular to a thickness direction, forming the tapered shape. According to this structure, the strong end surface portions of the stop member perpendicular to the thickness direction can receive reaction against the pressing force to the regulating member when inserting the stop member into the first hole of the upright portion of the base. Thus, the stop member can be inhibited from deformation resulting from insertion of the stop member.

In the aforementioned display screen turning apparatus according to the first aspect, the stop member is preferably fixed to the first hole of the upright portion of the base with an adhesive. According to this structure, the adhesive can effectively inhibit the stop member from slipping off from the upright portion after assembling. The stop member can be easily inhibited from slipping off from the upright portion by using the adhesive having wide versatility in view of usage, dissimilarly to a case of providing a new member for preventing the stop member from slipping off.

A display screen turning apparatus according to a second aspect of the present invention comprises a rotating member mounted with a display screen portion and rotatable in a horizontal plane, a plurality of slide members formed in a sphere and arranged inside an outer peripheral surface of the rotating member at prescribed intervals, a base made of sheet metal integrally formed with an upright portion rotatably holding the rotating member and having a first hole by partially uprighting toward a rotational center point of the rotating member and including an opening formed by partially uprighting located outside the outer peripheral surface of the rotating member, a regulating member so mounted on the upright portion of the base as to prevent the rotating member from moving upward, and a stop member in the form of a plate, including end surface portions forming a tapered shape, and holding a state where the regulating member is in contact with the rotating member by inserting the stop member into the first hole of the upright portion of the base and pressing the regulating member, wherein a side end surface portion in a thickness direction of the upright portion of the base comes into contact with the outer peripheral surface of the rotating member, the regulating member has a L-shaped longitudinal section by a first surface provided with a first contact portion coming into contact with the rotating member and a second surface provided with a projecting portion, and the base further has a second hole receiving the projecting portion of the regulating member and serving as a supporting point rotatably supporting the regulating member in a vertical direction, and the stop member receives pressing force of the regulating member with the end surface portions perpendicular to a thickness direction and is fixed to the first hole of the upright portion of the base with an adhesive.

As hereinabove described, the display screen turning apparatus according to the second aspect comprises the stop member formed in the tapered shape by the end surface portions, and inserted into the first hole of the upright portion of the base and holding the regulating member by press, whereby an operator simply inserts the stop member formed in the tapered shape so as to produce prescribed pressing force with respect to the regulating member into the first hole of the upright portion of the base when mounting the rotating member on the base. Thus, assembling workability of the operator can be improved. The display screen turning apparatus comprises the regulating member so mounted on the upright portion of the base rotatably holding the rotating member as to prevent the rotating member from moving upward and the stop member formed in the tapered shape by the end surface portions, and holding a state where the regulating member is in contact with the rotating member by inserting the stop member into the first hole of the upright portion of the base and pressing the regulating member, whereby the regulating member is held with the stop member while being always in contact with the rotating member, and hence no clearance occurs on the contact portion between the regulating member and the rotating member. Therefore, jolting of the rotating member can be suppressed.

In the display screen turning apparatus according to the second aspect, the base is made of sheet metal and the upright portion of the base is formed integrally with the base by partially uprighting the base, whereby the upright portion can easily be formed at the same time when the base of sheet metal is formed by press working, and the number of components can be inhibited from increase even when the upright portion is provided. Additionally no step is required for mounting the upright portion manufactured as an individual component on the base, whereby the assembling workability can be further improved. The side end surface portion in the thickness direction of the upright portion formed by partially uprighting the base made of sheet metal comes into contact with the outer peripheral surface of the rotating member, whereby the outer peripheral surface of the rotating member comes into contact with, not a cut surface, but a smooth sheet metal surface (end surface portion having small surface roughness in a thickness direction of sheet metal) dissimilarly to a case of coming into contact with the cut surface formed when partially cutting the upright portion from the base (end surface portion having large surface roughness in a direction perpendicular to the thickness direction of sheet metal), and hence the rotating member is inhibited from rotating while the rotational axis (rotation center) is decentered in the horizontal direction. Therefore, the rotating member can smoothly rotate on the base. The display screen turning apparatus comprises the plurality of slide members formed in the sphere and arranged inside the outer peripheral surface of the rotating member at prescribed intervals, wherein the upright portion of the base is uprighted from the base toward the rotational center point of the rotating member, and the opening formed in the base by partially uprighting is located outside the outer peripheral surface of the rotating member, whereby the spherical slide members arranged inside the rotating member are never overlapped with the opening of the base. Therefore, the spherical slide members can be inhibited from dropping from the opening of the base.

In the display screen turning apparatus according to the second aspect, the regulating member has a L-shaped longitudinal section by a first surface provided with a first contact portion coming into contact with the rotating member and a second surface provided with a projecting portion, and the base has a second hole receiving the projecting portion of the regulating member and serving as a supporting point rotatably supporting the regulating member in a vertical direction, whereby the first surface of the regulating member rotates in the vertical direction about the projecting portion inserted into the second hole of the base when the stop member is inserted into the upright portion of the base for bringing the regulating member into contact with the rotating member, whereby the regulating member can be easily brought into contact with the rotating member without jolting. The stop member is in the form of the plate and receives pressing force of the regulating member with the end surface portions perpendicular to the thickness direction, forming the tapered shape, whereby the strong end surface portions of the stop member perpendicular to the thickness direction can receive reaction against the pressing force to the regulating member when inserting the stop member into the first hole of the upright portion of the base. Thus, the stop member can be inhibited from deformation resulting from insertion of the stop member. The stop member is fixed to the first hole of the upright portion of the base with an adhesive, whereby the adhesive can effectively inhibit the stop member from slipping off from the upright portion after assembling. The stop member can be easily inhibited from slipping off from the upright portion by using the adhesive having wide versatility in view of usage, dissimilarly to a case of providing a new member for preventing the stop member from slipping off.

In the aforementioned display screen turning apparatus according to the second aspect, a plurality of the upright portions of the base are preferably so provided as to surround the outer peripheral surface of the rotating member so that movement of the rotating member in a horizontal direction can be regulated. According to this structure, the rotating member can be inhibited from rotating in a state where the rotational axis is decentered in the horizontal direction when rotating on the upper surface of the base.

In the aforementioned display screen turning apparatus according to the second aspect, a plurality of the upright portions of the base are preferably provided along the outer peripheral surface of the rotating member at substantially equal angular intervals in a plan view. According to this structure, the rotating member is rotatably held in the vicinity of the upright portion of the base circumferentially provided at equal angular intervals from the rotation center with uniform pressing force by the regulating member and hence the rotational torque of the rotating member can be inhibited from dispersion.

In the aforementioned display screen turning apparatus according to the second aspect, the first contact portion of the regulating member is preferably so formed on the first surface as to protrude toward an upper surface of the rotating member. According to this structure, only the first contact portion formed on the first surface is in contact with the upper surface of the rotating member when the first surface of the regulating member rotates toward the rotating member with the stop member and hence the rotating member can be stably rotated on the base while receiving frictional force properly controlled according to the size (contact area) of the first contact portion of the regulating member dissimilarly to a case where the first surface is entirely in contact with the upper surface of the rotating member, for example.

In the aforementioned display screen turning apparatus according to the second aspect, the regulating member preferably further has a second contact portion provided on an end of the second surface and coming into contact with an upper surface of the base when the projecting portion of the regulating member is inserted into the second hole of the base. According to this structure, the second contact portion of the end of the second surface provided with the projecting portion and the upper surface of the base come into contact with each other when inserting the projecting portion of the regulating member into the second hole of the base respectively so that the projecting portion is inserted into the second hole by a prescribed depth. Therefore, positioning in the vertical direction can be easily performed when mounting the regulating member on the base through the second hole. At this time, the regulating member is rotatably supported on the base with not only the projecting portion but also the second contact portion, and hence rotation of the regulating member by the stop member can be stably performed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be hereinafter described with reference to the drawings.

A structure of a display screen turning apparatus 20 and a liquid crystal television 100 provided with the display screen turning apparatus 20 according to the embodiment of the present invention will be now described with reference to FIGS. 1 to 11. This embodiment of the present invention is applied to a display screen turning apparatus of a liquid crystal television, which is an exemplary of a display apparatus.

Figure 1:
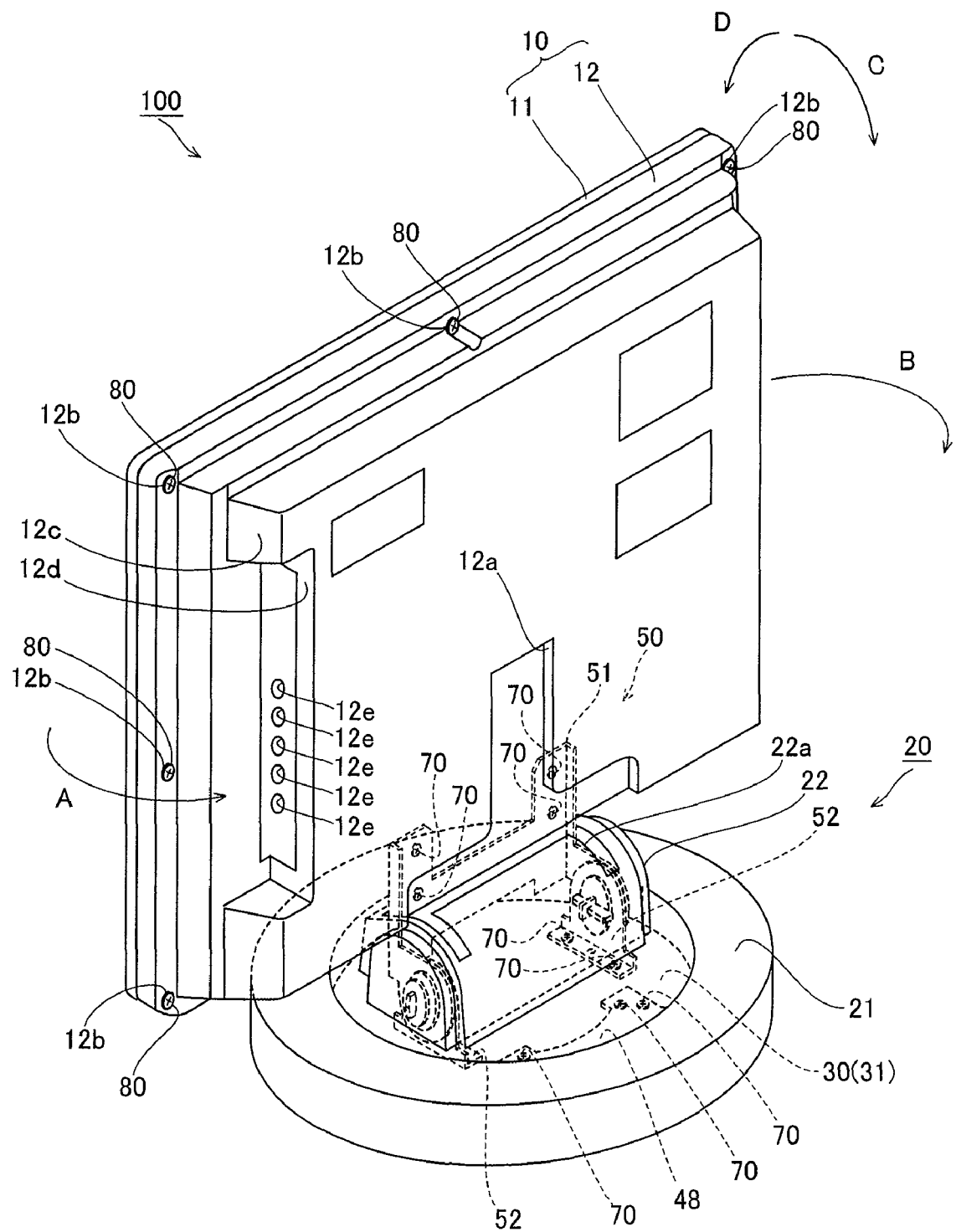
FIG. 1 is a perspective view showing an overall structure of a liquid crystal television provided with a display screen turning apparatus according to an embodiment of the present invention.

As shown in FIG. 1, the display screen turning apparatus 20 according to the embodiment of the present invention is so provided as to turn a display body 10 of the liquid crystal television 100 supported with a display screen support mechanism 50 in a horizontal direction (along arrows A and B) (by about ±30°, for example). The display body 10 is an example of the "display screen portion" in the present invention.

Figure 2:
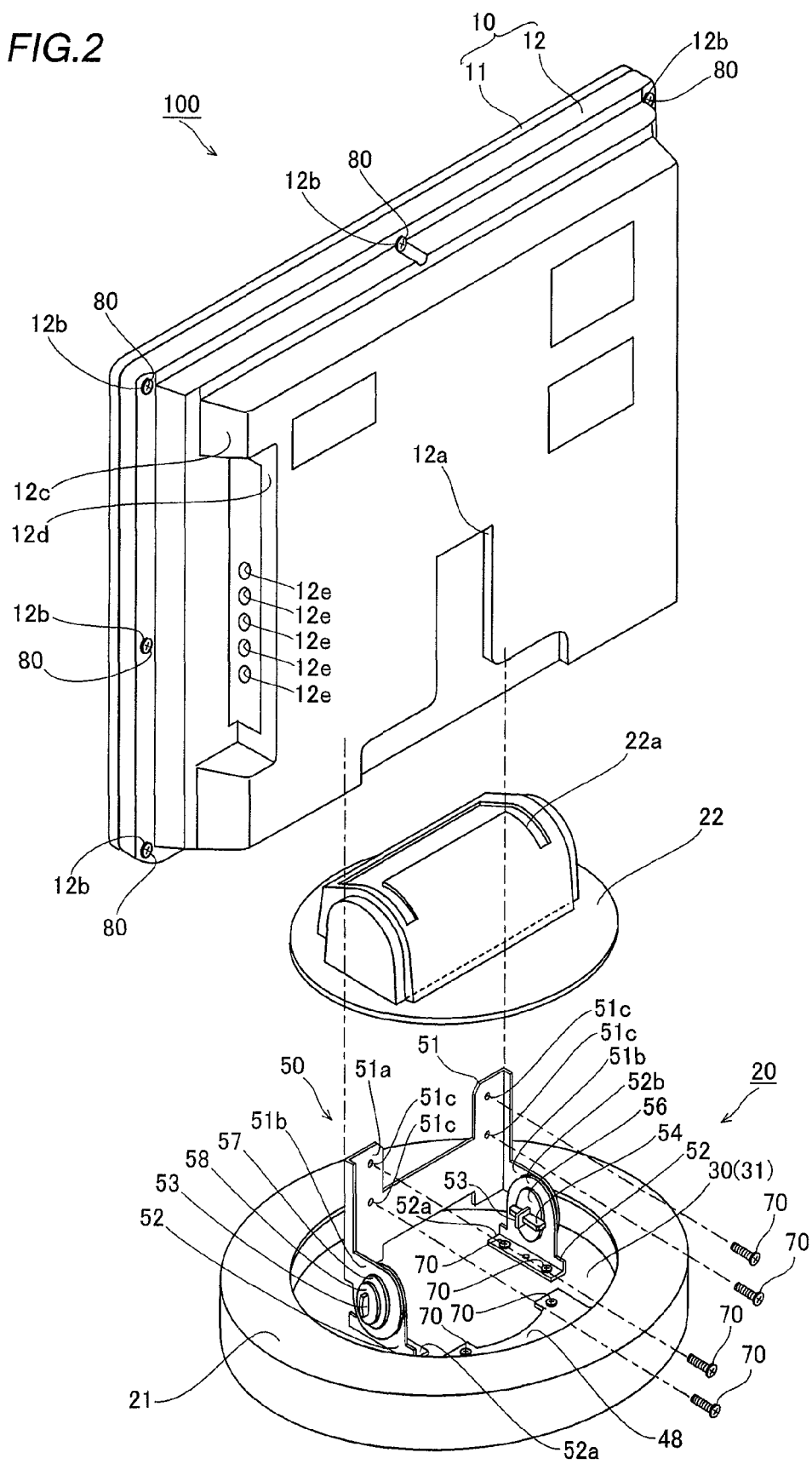
FIG. 2 is an exploded perspective view of the liquid crystal television provided with the display screen turning apparatus according to the embodiment of the present invention shown in FIG. 1.
Figure 3:
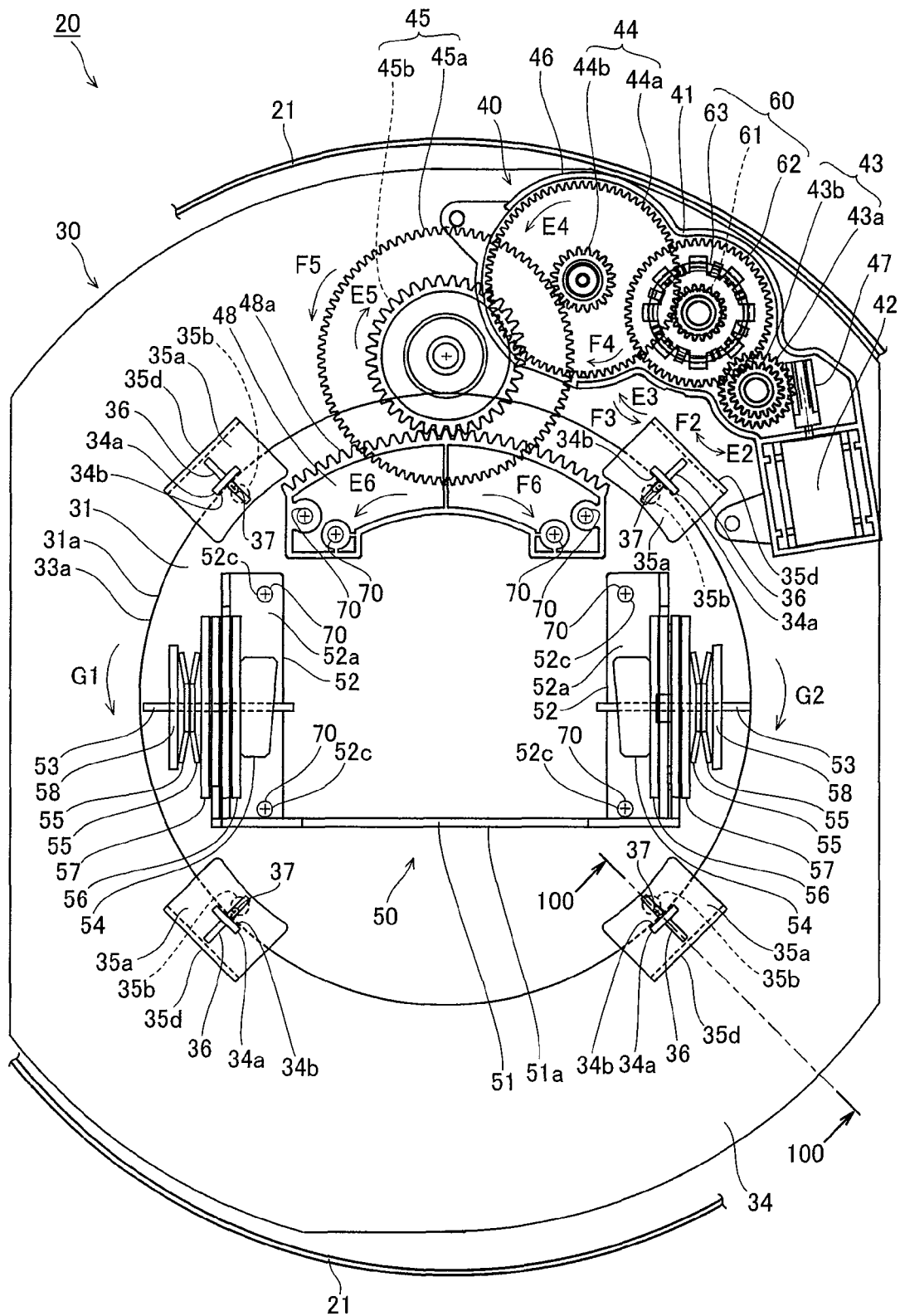
FIG. 3 is a plan view of the display screen turning apparatus according to the embodiment of the present invention shown in FIG. 1.

As shown in FIG. 3, the display screen turning apparatus 20 is constituted by a turning portion 30 for turning the display body 10 (see FIG. 2) supported with the display screen support mechanism 50 in the horizontal direction (along arrows A and B in FIG. 1) and a drive portion 40 provided for turning the turning portion 30 and constituted by a plurality of gears described later.

Figure 4:
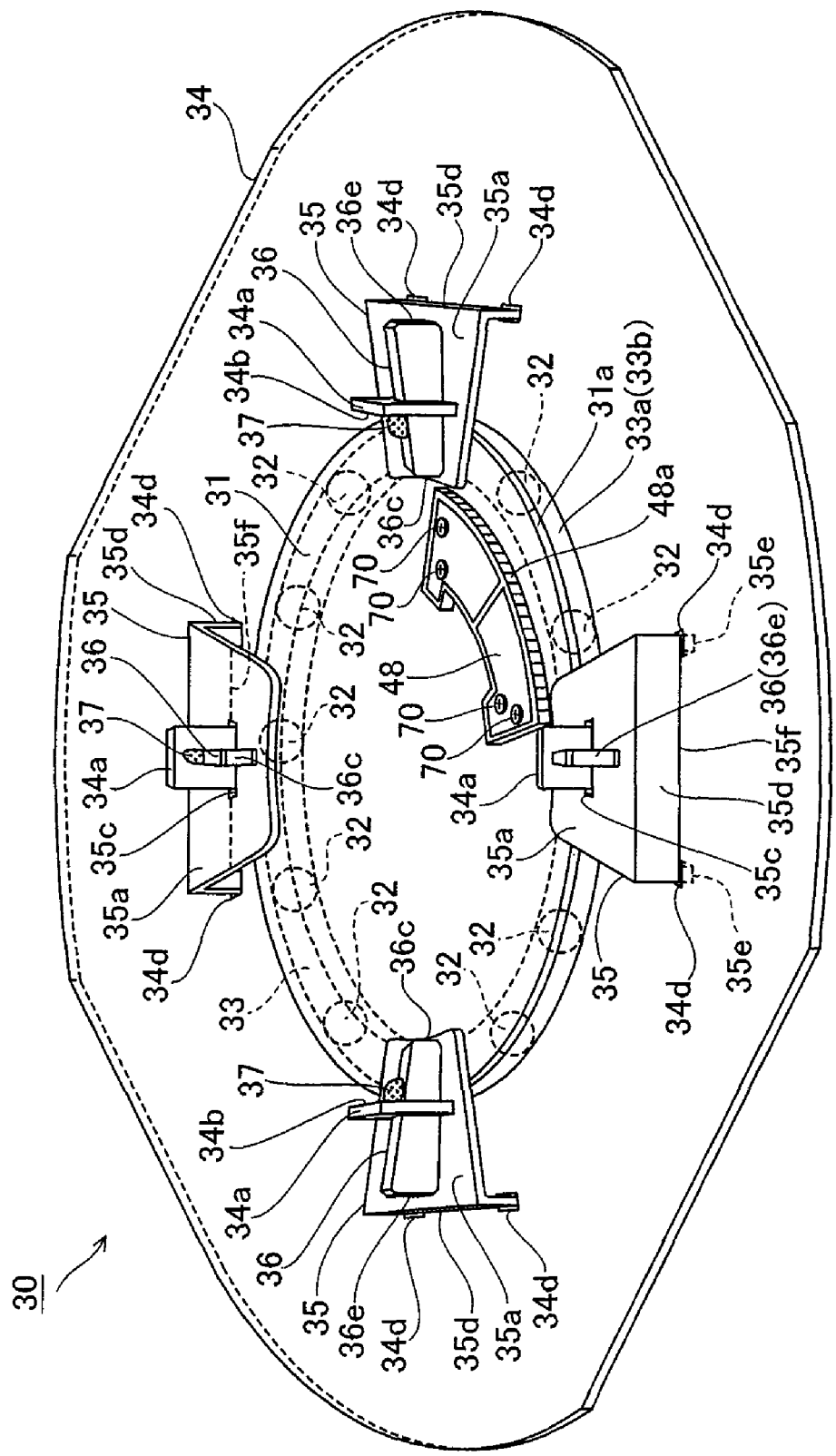
FIG. 4 is a perspective view for illustrating a structure of a turning portion of the display screen turning apparatus according to the embodiment of the present invention shown in FIG. 1.
Figure 5:
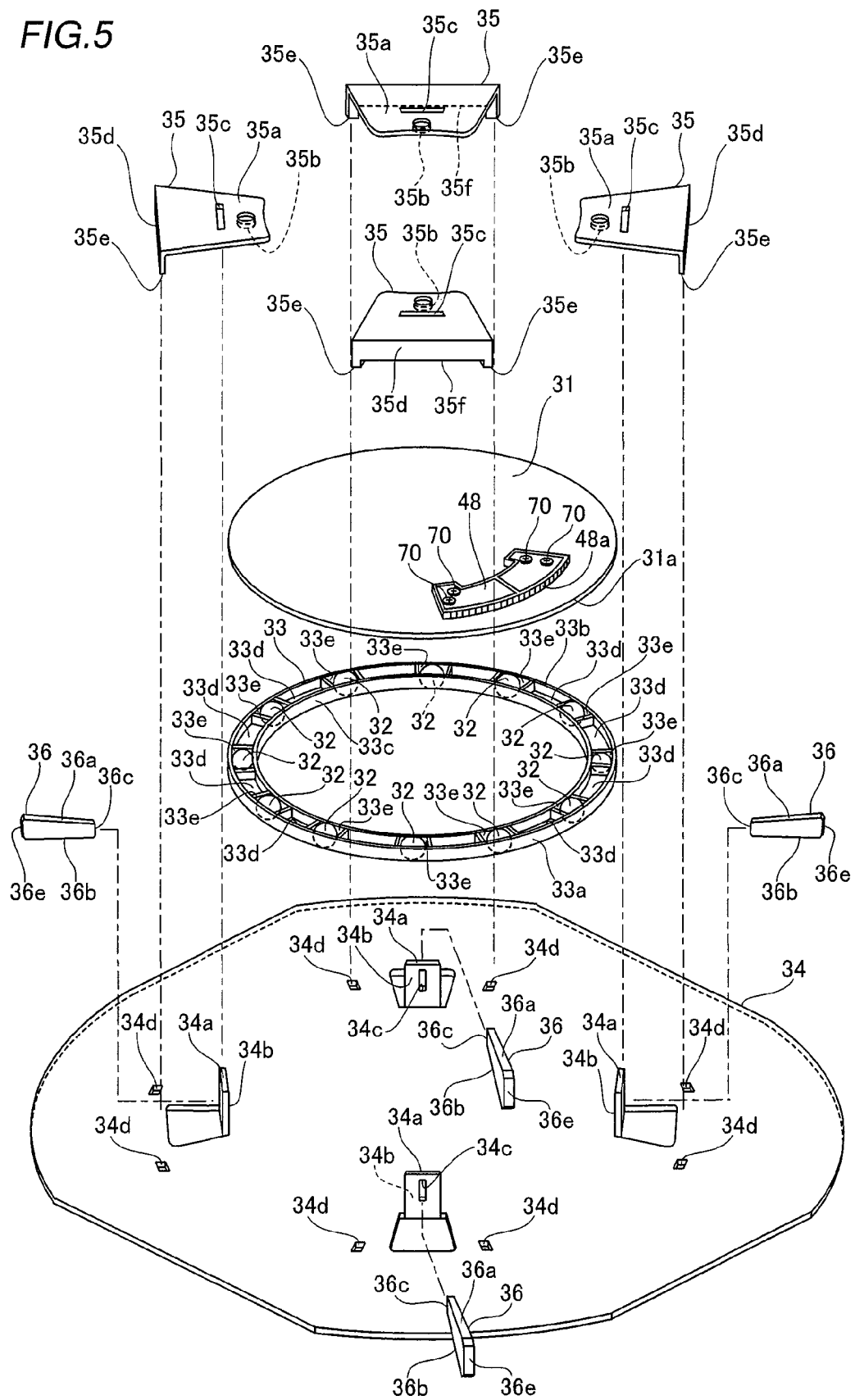
FIG. 5 is an exploded perspective view for illustrating the structure of the turning portion of the display screen turning apparatus according to the embodiment of the present invention shown in FIG. 1 in detail.

According to this embodiment, the turning portion 30 is constituted by a turning plate 31 made of sheet metal mounted with the display screen support mechanism 50 (see FIG. 2), a guide member 33 made of resin arranged with a plurality of steel balls 32 (twelve in this embodiment) at prescribed intervals (at intervals of about 30° in this embodiment) and rotatably holding the steel balls 32, a base 34 made of sheet metal, regulating members 35 (four in this embodiment) made of metal, and stop members 36 (four in this embodiment) made of sheet metal formed in a tapered shape, as shown in FIGS. 4 and 5. The turning plate 31 and the steel balls 32 are examples of the "rotating member" and the "slide member" in the present invention respectively. As shown in FIG. 5, the base 34 is integrally formed with upright portions 34a (four portions in this embodiment) each extending upward from the base 34 by partially uprighting the same from the base 34. The upright portions 34a are provided with rectangular holes 34c passing through first side surfaces 34b on substantial centers of the first side surfaces 34b as inner end surfaces in a thickness direction respectively. Each first side surface 34b and each hole 34c are examples of the "side end surface portion in a thickness direction" and the "first hole" in the present invention, respectively.

According to this embodiment, the upright portions 34a of the base 34 are so arranged as to surround an outer peripheral surface 31a at substantially equal angular intervals (at intervals of about 90° in this embodiment) in a state where the first side surfaces 34b are partially uprighted from the base 34 toward a rotational center point of the turning plate 31 and opposed to the outer peripheral surface 31a of the turning plate 31 as shown in FIGS. 4 and 5. As shown in FIG. 5, the base 34 is provided with a plurality of angular holes 34d (eight in this embodiment) on positions opposed to the regulating members 35 from above. The angular holes 34d each are formed to have a slightly larger size than after-mentioned projecting portions 35e of the regulating members 35. The pairs of projecting portions 35e of the regulating members 35 are inserted into the angular holes 34d respectively, thereby positioning the regulating members 35. Each angular hole 34d is an example of the "second hole" in the present invention.

Figure 6:
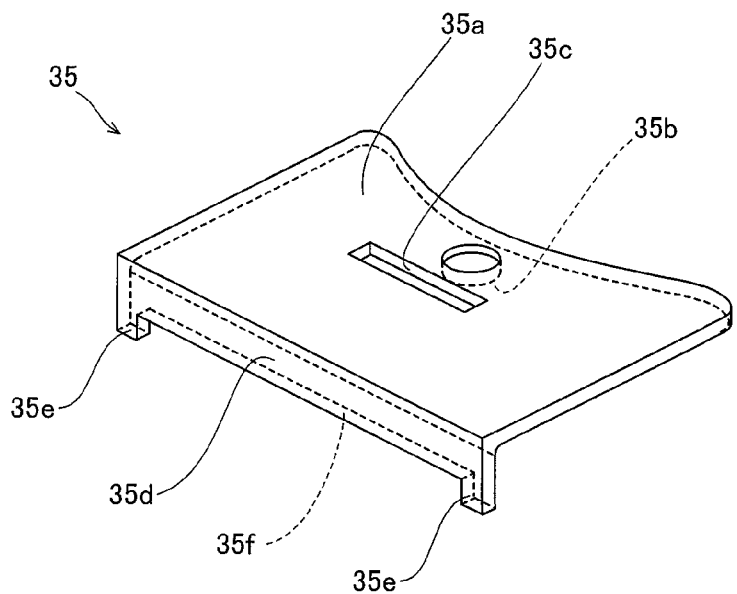
FIG. 6 is a plan view of a torque limiter according to the embodiment of the present invention shown in FIG. 1.
Figure 9:
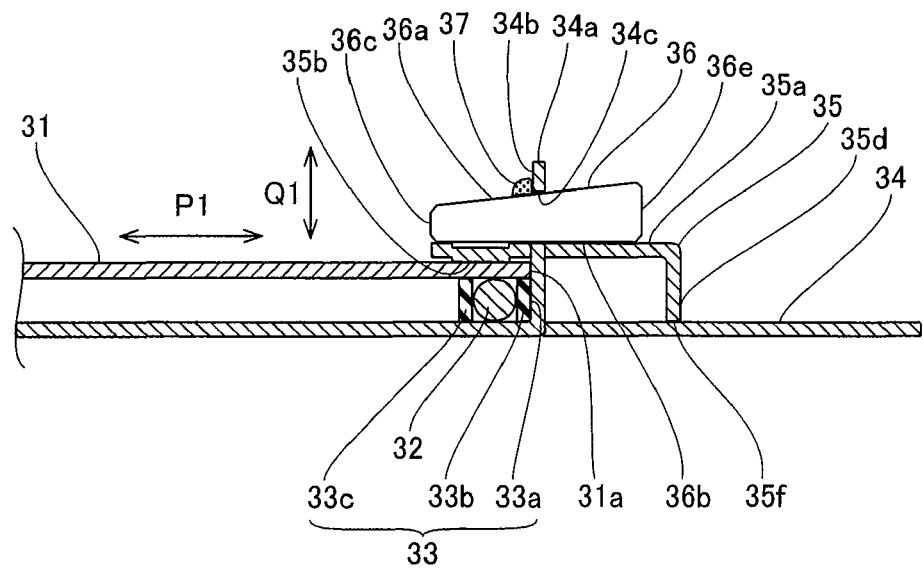
FIG. 9 is a sectional view taken along the line 100-100 in FIG. 3.

According to this embodiment, each regulating member 35 is constituted by a first plane 35a provided with a contact portion 35b coming into contact with the turning plate 31 (see FIG. 9) and a rectangular hole 35c (see FIG. 6) by press working and a second plane 35d forming a L-shaped longitudinal section (see FIG. 9) of the regulating member 35 by being bent from an end of the first plane 35a substantially by 90° as shown in FIGS. 6 and 9. In each regulating member 35, the projecting portions 35e (two portions in this embodiment) extending downward are integrally provided with the second plane 35d on both ends of the second plane 35d, as shown in FIGS. 5 and 6. Each first plane 35a and each second plane 35d are examples of the "first surface" and the "second surface" in the present invention respectively, and each contact portion 35b is an example of the "first contact portion" in the present invention.

The regulating members 35 are provided with the contact portions 35f on ends of the second planes 35d as shown in FIGS. 6 and 9. The contact portions 35f come into contact with an upper surface of the base 34 when the projecting portions 35e of the regulating members 35 are inserted into the angular holes 34d of the base 34 so that the positioning of the regulating members 35 in a vertical direction (along arrow Q1 in FIG. 9) can be performed. Each contact portion 35f is an example of the "second contact portion" in the present invention.

According to this embodiment, the turning portion 30 is constituted such that the first planes 35a of the regulating members 35 are fitted onto the upright portions 34a (four portions) through the holes 35c (see FIG. 5) respectively in a state where the turning plate 31 arranged with the guide member 33 rotatably holding the steel balls 32 therein is placed on a lower surface side on the base 34 so as to be surrounded by the upright portions 34a of the base 34, as shown in FIG. 4. The stop members 36 are inserted into the holes 34c (see FIG. 5) of the upright portions 34a in a horizontal direction respectively, as shown in FIG. 4. At this time, the regulating members 35 can rotate about the projecting portions 35e (see FIG. 6) and the contact portions 35f (see FIG. 9) in a vertical direction (along arrow Q in FIG. 9) in a state of inserting the projecting portions 35e of the regulating members 35 into the angular holes 34d of the base 34 so that the turning plate 31 can be pressed downward with insertion of the stop members 36. As shown in FIGS. 4 and 9, positions of the stop members 36 are fixed with adhesives 37 in a state where the stop members 36 are inserted into the holes 34c (see FIG. 5) of the base 34.

Figure 7:
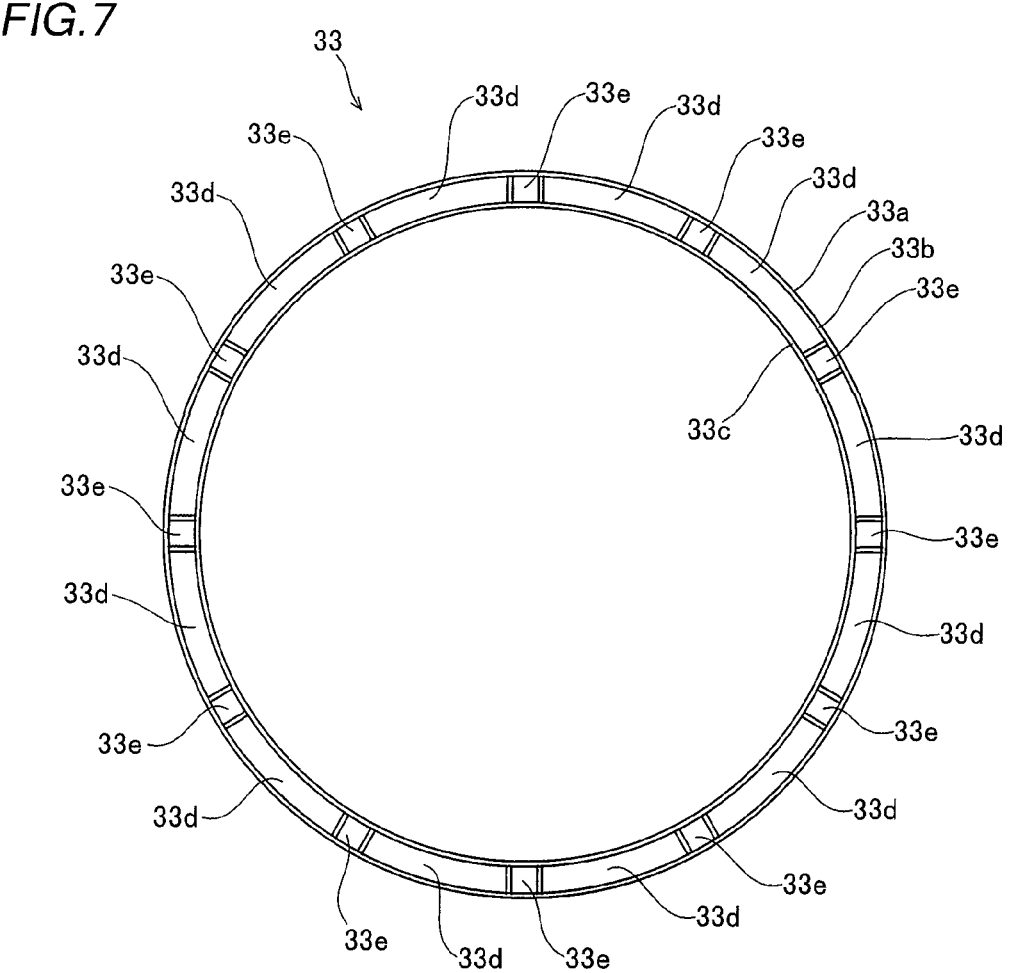
FIG. 7 is a diagram showing a guide member of the display screen turning apparatus according to the embodiment of the present invention shown in FIG. 1.

As shown in FIGS. 5 and 7, in the guide member 33 made of resin, a circular outer guide portion 33b having the diameter of the outer peripheral surface 33a identical with the diameter of the turning plate 31 (see FIG. 5) and an inner guide portion 33c linked to each other with horizontal connecting portions 33d (twelve locations) and twelve divided rooms 33e in which the steel balls 32 (see FIG. 5) are arranged are integrally formed so as to separate between the connecting portions 33d. Therefore, as shown in FIG. 9, the guide member 33 is held with the upright portions 34a along with the turning plate 31 while coming into contact with the first side surfaces 34b of the upright portions 34a of the base 34, so that the guide member 33 can rotate on the base 34 in the horizontal direction.

Figure 8:
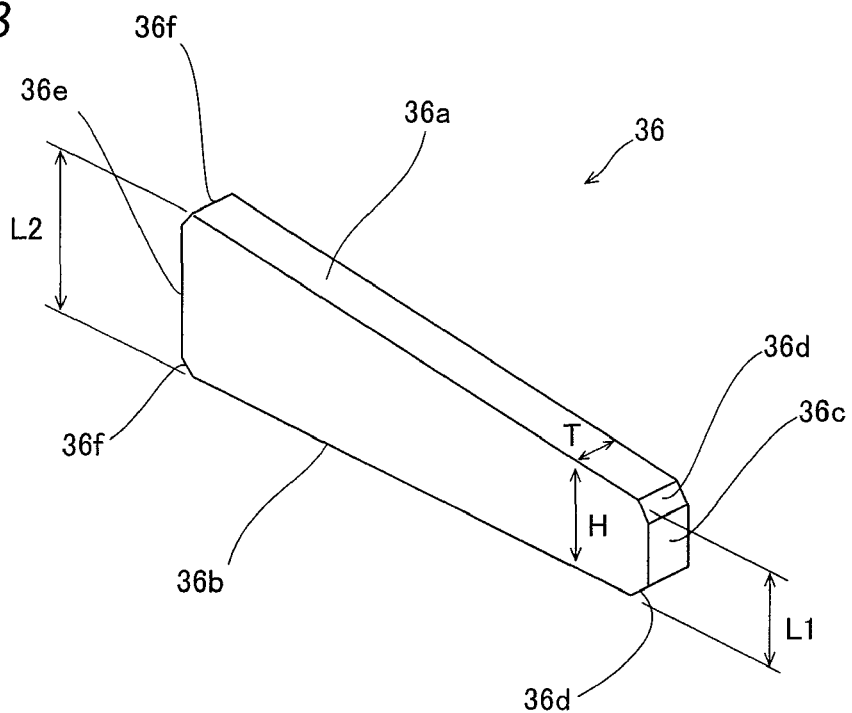
FIG. 8 is a diagram showing a stop member of the display screen turning apparatus according to the embodiment of the present invention shown in FIG. 1.

According to this embodiment, each stop member 36 made of sheet metal has a tapered shape formed by an end surface portion 36a and an end surface portion 36b, and includes chamfers 36d provided on a first side surface 36c extending in a longitudinal direction and chamfers 36f provided on a second side surface 36e extending in the longitudinal direction, as shown in FIG. 8. As shown in FIG. 8, the length L1 of the first side surface 36c of each stop member 36 is smaller than the length L2 of each second side surface 36c, distance between each end surface portion 36a and each end surface portion 36b (length of direction H perpendicular to a thickness direction of each stop member 36) is linearly changed from L1 to L2. Thus, as shown in FIG. 4, the stop members 36 are formed in a wedged (tapered) manner so that the stop members 36 fill spaces from the first planes 35a of the regulating members 35 to upper surfaces of the holes 34c of the upright portions 34a and are pressed (press-fitted) in a direction from the first side surfaces 36c to the second side surfaces 36c by prescribed sliding quantity, whereby the first planes 35a of the regulating members 35 can be pressed downward with prescribed pressing force. As shown in FIG. 8, the stop members 36 is so formed that the upper and down end surface portions 36a and 36b in the direction H perpendicular to the thickness direction T receive reaction (reaction against pressing force to the regulating members 35) from the regulating members 35.

As shown in FIG. 8, the chamfers 36d of the stop members 36 are provided in order to easily insert the stop members 36 into the holes 34c (see FIG. 5) of the base 34 respectively.

As shown in FIG. 3, the drive portion 40 is constituted by a transmission gear portion 41 for rotating the turning portion 30 and a stepping motor 42 employed as a driving source of the transmission gear portion 41. As shown in FIG. 3, the transmission gear portion 41 is constituted such that a gear 43 made of resin, a torque limiter 60, a gear 44 made of resin and a gear 45 made of resin are arranged in a gear box 46 made of resin.

Figure 10:
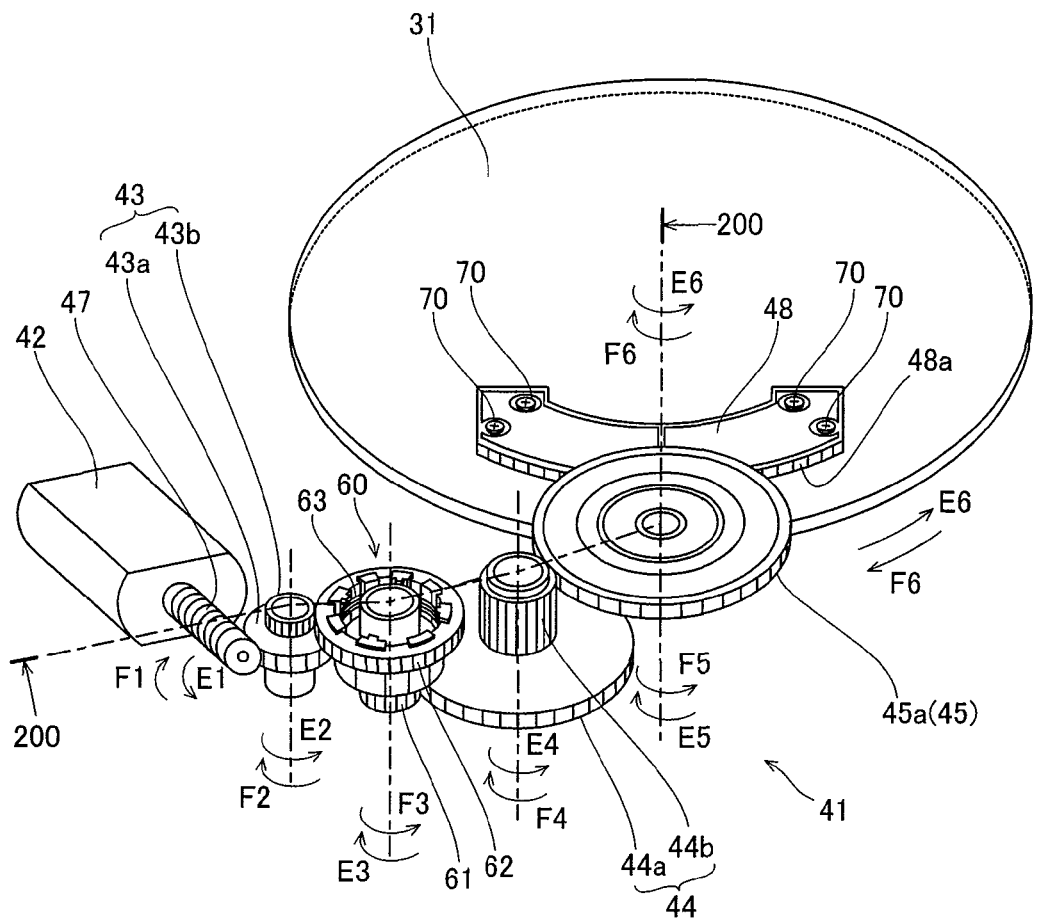
FIG. 10 is a perspective view for illustrating a structure of a transmission gear portion of the display screen turning apparatus according to the embodiment of the present invention shown in FIG. 1.
Figure 11:
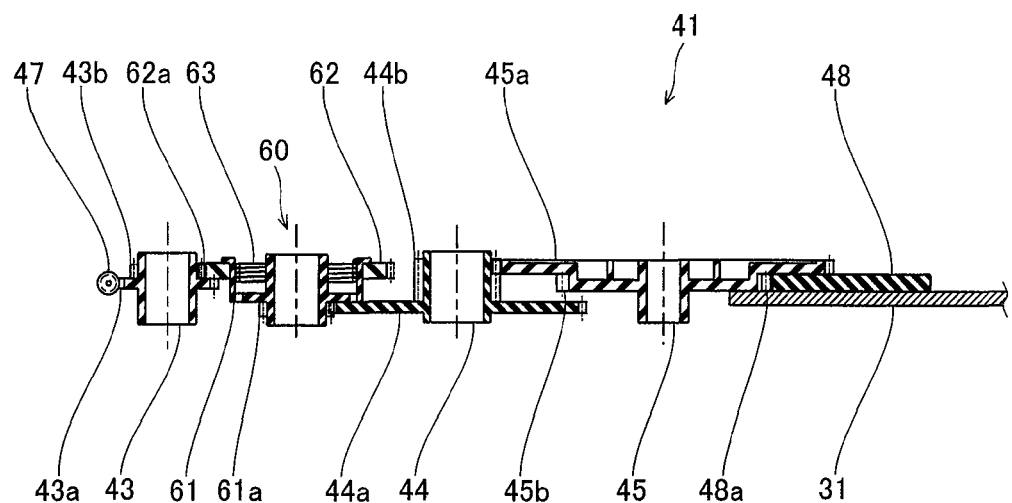
FIG. 11 is a sectional view taken along the line 200-200 in FIG. 10.

As shown in FIG. 10, a worm gear 47 made of resin is press-fitted into the rotational axis of the stepping motor 42. As shown in FIGS. 10 and 11, the gear 43 integrally includes a major-diametral gear portion 43a and a minor-diametral gear portion 43b. The gear 44 integrally includes a major-diametral gear portion 44a and a minor-diametral gear portion 44b. The gear 45 integrally includes a major-diametral gear portion 45a and a minor-diametral gear portion 45b. As shown in FIGS. 3, 5 and 10, a turning gear member 48 made of resin is fixed on an upper surface of the turning plate 31 of the turning portion 30 with four screws 70. In FIG. 10, the gear box 46 (see FIG. 3) for arranging the transmission gear portion 41 and the stepping motor 42 therein is not shown in the drawing in order to describe a structure of the transmission gear portion 41.

As shown in FIGS. 10 and 11, the worm gear 47 is meshed with the major-diametral gear portion 43a of the gear 43 perpendicular to the rotational axis and the minor-diametral gear portion 43b of the gear 43 is meshed with the gear portion 62a of the drive gear 62 of the torque limiter 60 parallel to the rotational axis. As shown in FIGS. 10 and 11, the gear portion 61a of a driven gear 61 of the torque limiter 60 is meshed with the major-diametral gear portion 44a of the gear 44 parallel to the rotational axis and the minor-diametral gear portion 44b of the gear 44 is meshed with the major-diametral gear portion 45a of the gear 45 parallel to the rotational axis. As shown in FIGS. 10 and 11, the minor-diametral gear portion 45b of the gear 45 is meshed with a turning gear portion 48a of the turning gear member 48 parallel to the rotational axis. Therefore, the driving force of the stepping motor 42 is transmitted to the turning plate 31 through the worm gear 47, the gear 43, the torque limiter 60, the gear 44, the gear 45 and the turning gear member 48 from arrangement of the aforementioned gear member shown in FIGS. 10 and 11.

The torque limiter 60 is constituted by the driven gear 61 made of resin, the drive gear 62 made of resin, and a spring member 63 (coil spring) made of metal, as shown in FIGS. 10 and 11. The torque limiter 60 is constituted such that the driving force of the stepping motor 42 is transmitted to the turning portion 30 through the transmission gear portion 41 to turn the turning portion 31 inside the display screen turning apparatus 20 when the driving force of the stepping motor 42 is less than prescribed driving torque, while the driving force of the stepping motor 42 is not transmitted to the turning portion 30 when the driving force of the stepping motor 42 is prescribed driving torque or more.

The display screen support mechanism 50 is fixed to the upper surface of the turning plate 31 of the turning portion 30 provided on the display screen turning apparatus 20 with the four screws 70 as shown in FIG. 2, for rendering the display body 10 rotatable in the vertical direction (along arrows C and D) with respect to the display screen turning apparatus 20 while supporting the display body 10 in a state inclined in the vertical direction (along arrows C and D) by a prescribed angle with respect to the display screen turning apparatus 20, as shown in FIG. 1.

As shown in FIGS. 2 and 3, the display screen support mechanism 50 is constituted by a display screen support member 51 made of sheet metal, a pair of vertical support members 52, platelike support shafts 53 made of sheet metal, stop members 54 of sheet metal, disc springs 55 (four in this embodiment) made of metal, pressure-contact plates 56 and 57 made of sheet metal and plate members 58 coming into contact with the disk springs 55 made of metal, and the display screen support member 51 is so mounted on the pair of vertical support members 52 as to be rotatable at prescribed torque or more.

The display screen support member 51 made of sheet metal integrally includes a display body mounting portion 51a and a pair of rotating portions 51b as shown in FIG. 2. The display body mounting portion 51a of the display screen support member 51 is provided with four screw receiving holes 51c. The pair of rotating portions 51b of the display screen support member 51 are so provided as to extend from both side ends of the display body mounting portion 51a in a vertical direction with respect to a surface of the display body mounting portion 51a respectively.

The pair of vertical support members 52 include turning plate-mounting portions 52a and rotating portion-mounting portions 52b respectively, as shown in FIGS. 2 and 3. The turning plate-mounting portions 52a of the vertical support members 52 are provided with four screw receiving holes 52c (see FIG. 3). The rotating portion mounting portion 52b of the vertical support members 52 are so provided as to upwardly extend in a vertical direction with respect to surfaces of the turning plate-mounting portions 52a from first ends of the turning plate-mounting portions 52a.

As shown in FIGS. 1 and 2, the display body 10 is constituted by a front cabinet 11 made of resin and a rear cabinet 12 made of resin. A liquid crystal module (not shown) mounted with a liquid crystal panel (not shown) is so formed inside the display body 10 as to be surrounded by the front cabinet 11 and the rear cabinet 12. The display body 10 is mounted on the display screen support member 51 by fastening the screws 70 to screw mounting holes (not shown) through the screw receiving holes 51c of the display screen support member 51. The rear cabinet 12 is integrally provided with a notch 12a for arranging the display screen support member 51 in a concealed manner. A plurality of screw receiving holes 12b (seven portions in this embodiment) are provide on an outer peripheral portion of the rear cabinet 12 so that the rear cabinet 12 is mounted on the front cabinet 11 through screws 80. As shown in FIG. 2, a rectangular recess portion 12d is formed in the side surface portion 12c of the rear cabinet 12 and is formed with a plurality of through-holes 12e. The plurality of through-holes 12e are provided for connecting cables from AV terminals (not shown) connected to control boards (not shown) for controlling the liquid crystal module to an external apparatus of the display body 10.

As shown in FIGS. 1 and 2, the display screen turning apparatus 20 is mounted with a cover member 21 made of resin on the base 34 of the turning portion 30 from a lower surface side of the base 34 with screws (not shown). As shown in FIGS. 1 and 2, a cover member 22 made of resin is so mounted as to cover the turning portion 30 from above and allow turn in the horizontal direction (along arrows A and B in FIG. 1) along with the turning portion 30. As shown in FIGS. 1 and 2, the cover member 22 made of resin is provided with a notch 22a for rotatably arranging the display screen support mechanism 50 in a vertical direction (along arrows C and D in FIG. 1).

A horizontal turning operation of the display screen turning apparatus 20 according to this embodiment will be now described with reference to FIGS. 1, 3, 4, 9, 10, 12 and 13.

As shown in FIG. 3, a user presses an auto-turn button (not shown) of an attached remote control (not shown) in a state where the display screen support member 51 is directed frontward (state where a central portion of the turning gear portion 48a of the turning gear member 48 is meshed with the minor-diametral gear portion 45b of the gear 45), whereby a signal turning the display body 10 (see FIG. 1) in a horizontal direction (along arrow A in FIG. 1) is transmitted to a control circuit portion (not shown) of the display body 10. The stepping motor 42 of the display screen turning apparatus 20 is driven on the basis of this signal. More specifically, the worm gear 47 mounted on the stepping motor 42 rotates along arrow E1 (see FIG. 10) following the drive of the stepping motor 42, and the drive gear 62 of the torque limiter 60 rotates along arrow E3 through the gear 43, as shown in FIG. 3. The driven gear 61 of the torque limiter 60 rotates along arrow E3 and the turning gear member 48 rotates along arrow E6 through the gear 44 and the gear 45. Thus, the turning plate 31 on the turning portion 31 mounted with the display screen support member 51 start turning along arrow G1 as shown in FIG. 12 and hence the display body 10 (see FIG. 1) starts turning along arrow A (see FIG. 1).

Figure 12:
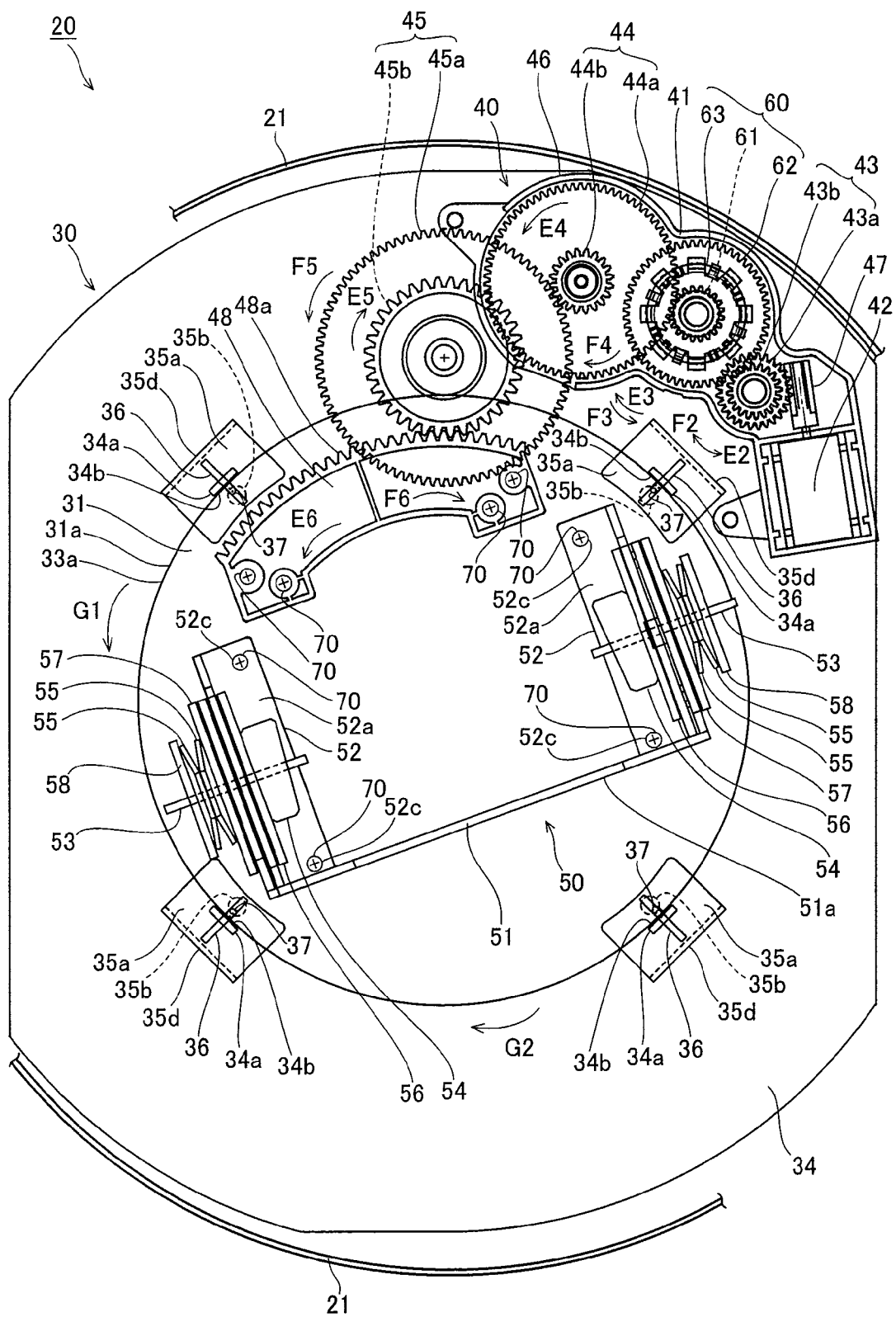
FIGS. 12 and 13 are diagrams for illustrating a turning operation of the display screen turning apparatus according to the embodiment of the present invention shown in FIG. 1.
Figure 13:
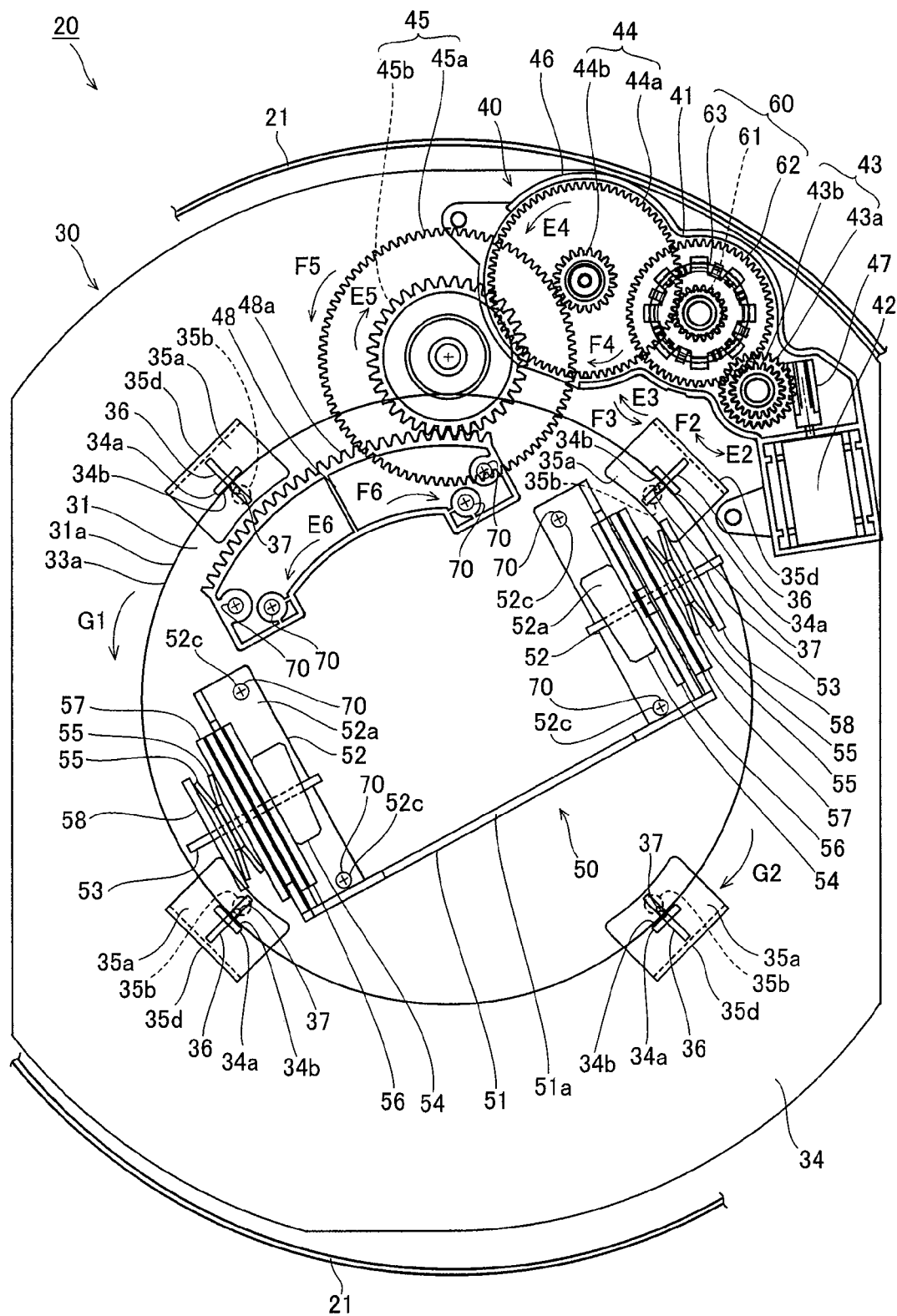

As shown in FIG. 12, the turning plate 31 on the turning portion 30 placed with the display body 10 (see FIG. 10) continuously turns along arrow A (see FIG. 1) at a prescribed rotational speed.

According to this embodiment, as shown in FIG. 4, the turning plate 31 turns on the base in a state of pressing the turning plate 31 turns toward the base 34 (downward) with the regulating members 35 and the stop members 36 through prescribed pressing force. At this time, the contact portions 35b of the four regulating members 35 all come into contact with the upper surface of the turning plate 31, and the outer peripheral surface 31a of the turning plate 31 and the outer peripheral surface 33a of the guide member 33 come into contact with the first side surfaces 34b of the upright portions 34a of the base 34, so that the turning plate 31 turns on the base 34 without jolting along either arrow P1 and arrow Q1, as shown in FIG. 9.

When the display body 10 is turned by an angle desired by the user, the user releases the press of the auto-turn button (not shown) of the attached remote control (not shown), whereby the signal turning the display body 10 (see FIG. 1) in the horizontal direction (along arrow A in FIG. 1) is not transmitted to the control circuit portion (not shown) of the display body 10. Therefore, the drive of the stepping motor 42 is stopped. Thus, the turning portion 30 stops the turn along arrow G1 at a position shown in FIG. 12 and stands still.

In a state where the user continues the turning operation of the display body 10 (see FIG. 1) along arrow A (see FIG. 1), when the turning angle of the turning portion 30 is maximum (about 30° in this embodiment), the turning plate 31 comes into contact with stopper members (not shown) provided inside the turning portion 30 to regulate the turning operation along arrow A (see FIG. 1). Therefore, the turning portion 30 stops the turn along arrow G1 at a position shown in FIG. 13 and stands still. At this time, the stepping motor 47 continuously drives and hence driving torque transmitted from the stepping motor 42 is transmitted to the drive gear 62 of the torque limiter 60 through the worm gear 47 and the gear 43.

The drive gear 62 is pressed against the driven gear 61 with the urging force previously set by the spring member 63, and therefore the inner peripheral surface of the drive gear 62 and the outer peripheral surface of the driven gear 61 slip so that the driving torque of the drive gear 62 is not transmitted to the driven gear 61, when driving torque, which is not less than the frictional force between the inner peripheral surface of the drive gear 62 and the outer peripheral surface of the driven gear 61 following the pressure contact force of the spring member 63, occurs with respect to the drive gear 62. In other words, when turning plate 31 comes into contact with stopper members (not shown), the driven gear 61, the gear 44, the gear 45 and the turning gear member 48 stop rotation regardless of the rotation of the drive gear 62.

While the turning portion 30 is turned along arrow G1 shown in FIG. 12 in the description on the aforementioned turning operation, the turning plate 31 is turned along arrow G2 by rotational operation similar to the aforementioned rotational operation and the display body 10 (see FIG. 1) is turned along arrow B (see FIG. 1) also at the time of a turning operation of turning the turning plate 31 along arrow G1 opposite to arrow G2.

According to this embodiment, as hereinabove described, the display screen turning apparatus 20 comprises the stop members 36 formed in a tapered shape by the end surface portions 36a and the end surface portions 36b, and inserted into the holes 34c of the upright portions 34a of the base 34 and holding the regulating members 35 by press, whereby an operator simply inserts the stop members 36 formed in the tapered shape so as to produce prescribed pressing force with respect to the regulating members 35 into the holes 34c of the upright portions 34a of the base 34 when mounting the turning plate 31 on the base 34. Thus, assembling workability of the operator can be improved. The display screen turning apparatus 20 comprises the regulating members 35 so mounted on the upright portions 34a of the base 34 rotatably holding the turning plate 31 as to prevent the turning plate 31 from moving upward and the stop members 36 formed in a tapered shape by the end surface portions 36a and the end surface portions 36b, and holding a state where the contact portions 35b of the regulating members 35 are in contact with the upper surface of the turning plate 31 by inserting the stop members 36 into the holes 34c of the upright portions 34a of the base 34 and pressing the regulating members 35, whereby the regulating members 35 are held with the stop members 36 while always being in contact with the turning plate 31 through the contact portions 35b, and hence no clearance occurs on the contact portions 35b between the regulating members 35 and the upper surface of the turning plate 31. Therefore, jolting of the turning plate 31 in the vertical direction (along arrow Q in FIG. 9) can be suppressed.

According to this embodiment, the base 34 is made of sheet metal, the upright portions 34a of the base 34 are integrally formed with the base 34 by partially uprighting the base 34, whereby the upright portions 34a can easily be formed at the same time when the base 34 of sheet metal is formed by press working, and the number of components can be inhibited from increase even when the upright portions 34a are provided. Additionally no step is required for mounting the upright portions 34 manufactured as individual components on the base 34, whereby the assembling workability can be further improved.

According to this embodiment, the upright portions 34a formed by partially uprighting the base 34 of sheet metal are so formed as to come into contact with the outer peripheral surface 31a of the turning plate 31 on the first side surfaces 34b as the inner side end surface portion in the thickness direction, whereby the outer peripheral surface 31a of the turning plate 31 comes into contact with, not cut surfaces, but smooth sheet metal surfaces (first side surfaces 34b having small surface roughness in a thickness direction of sheet metal) dissimilarly to a case of coming into contact with the cut surfaces formed when partially cutting the upright portions 34a from the base 34 (end surface portions having large surface roughness in a direction perpendicular to the thickness direction of sheet metal), and hence the turning plate 31 can be inhibited from rotating while the rotational axis (rotation center) is decentered in the horizontal direction (along arrow P1 in FIG. 9). Therefore, the turning plate 31 can smoothly rotate on the base 34.

According to this embodiment, the plurality of upright portions 34a of the base 34 are provided so as to surround the outer peripheral surface 31a of the turning plate 31 so that movement of the turning plate 31 in the horizontal direction can be regulated, whereby the turning plate 31 can be inhibited from rotating in a state where the rotational axis is decentered in the horizontal direction when rotating on the upper surface of the base 34.

According to this embodiment, the upright portions 34a of the base 34 are provided along the outer peripheral surface 31a of the turning plate 31 at substantially equal angular intervals (intervals of about 90° in this embodiment) in plan view, whereby the turning plate 31 is rotatably held in the vicinity of the upright portions 34a of the base 34 circumferentially provided at equal angular intervals from the rotation center with uniform pressing force by the regulating members 35 and hence the rotational torque of the turning plate 31 can be inhibited from dispersion.

According to this embodiment, the display screen turning apparatus 20 comprises the twelve steel balls 32 formed in a sphere and arranged at equal angular intervals of 30° in the guide member 33 provided inside the outer peripheral surface 31a of the turning plate 31, the upright portions 34a of the base 34 are partially uprighted from the base 34 in a direction toward the rotational center point of the turning plate 31, and openings formed in the base 34 by partially uprighting is located outside the outer peripheral surface 31a of the turning plate 31, whereby the steel balls 32 arranged inside the turning plate 31 are never overlapped with the openings of the base 34. Therefore, the steel balls 32 can be inhibited from dropping from the openings of the base 34.

According to this embodiment, the regulating members 35 are formed in the L-shaped longitudinal section by the first planes 35a provided with the contact portions 35b coming into contact with the turning plate 31 and the second planes 35d provided with the projecting portions 35e, whereby the base 34 is provided with the angular holes 34d receiving the projecting portions 35e of the regulating members 35 and serving as supporting points for rotatably supporting the regulating members 35 in the vertical direction (along arrow Q1 in FIG. 9) so that the first planes 35a of the regulating members 35 rotate in the vertical direction (along arrow Q1 in FIG. 9) about the projecting portions 35e inserted into the angular holes 34d of the base 34 when the stop members 36 are inserted into the upright portions 34a of the base 34 for bringing the regulating members 35 into contact with the turning plate 31. Thus, the regulating members 35 can be easily brought into contact with the turning plate 31 without jolting.

According to this embodiment, the contact portions 35b of the regulating members 35 are so formed in the first planes 35a as to protrude toward the upper surface of the turning plate 31 by press working, whereby only the contact portions 35b formed on the first planes 35a is in contact with the upper surface of the turning plate 31 when the first planes 35a of the regulating members 35 rotate toward the turning plate 31 with the stop members 36 and hence the turning plate 31 can be stably rotated on the base 34 while receiving frictional force properly controlled according to the sizes (contact areas) of the contact portions 35b of the regulating members 35 dissimilarly to a case where the first planes 35a is entirely in contact with the upper surface of the turning plate 31, for example.

According to this embodiment, the regulating members 35 is so formed as to have the contact portions 35f coming into contact with the upper surface of the base 34 when inserting the projecting portions 35e of the regulating members 35 provided on the ends of the second planes 35d into the angular holes 34d of the base 34, whereby the contact portions 35f of the ends of the second planes 35d provided with the projecting portions 35e and the upper surface of the base 34 come into contact with each other when inserting the projecting portions 35e of the regulating members 35 into the angular holes 34d of the base 34 respectively so that the projecting portions 35e are inserted into the angular holes 34d by a prescribed depth. Therefore, positioning in the vertical direction (along arrow Q in FIG. 9) can be easily performed when mounting the regulating members 35 on the base 34 through the angular holes 34d. At this time, the regulating members 35 are rotatably supported on the base 34 with not only the projecting portions 35e but also the contact portions 35f, and hence rotation of the regulating members 35 by the stop members 36 can be stably performed.

According to this embodiment, the stop members 36 are in the form of a plate and pressing force by the regulating members 35 is received with the end surface portions 36a and 36b in the direction H (see FIG. 8) perpendicular to the thickness direction T (see FIG. 8), whereby the strong end surface portions 36a and 36b of the stop members in the direction H (see FIG. 8) perpendicular to the thickness direction T (see FIG. 8) can receive reaction against the pressing force to the regulating members 35 when inserting the stop members 36 into the holes 34c of the upright portions 34a of the base 34. Thus, the stop members 36 can be inhibited from deformation resulting from insertion of the stop members 36.

According to this embodiment, the stop members 36 are so formed as to be fixed to the holes 34c of the upright portions 34a of the base 34 with adhesives 37, whereby the adhesives 37 can effectively inhibit the stop members 36 from slipping off from the upright portions 34a after assembling. The stop members 36 can be easily inhibited from slipping off from the upright portions 34a by using the adhesives 37 having wide versatility in view of usage, dissimilarly to a case of providing new members for preventing the stop members 36 from slipping off.

Although the present invention has been described and illustrated in detail, it is clearly understood that the same is by way of illustration and example only and is not to be taken by way of limitation, the spirit and scope of the present invention being limited only by the terms of the appended claims.

For example, while the display screen turning apparatus is provided in the liquid crystal display employed as an exemplary display in the aforementioned embodiment, the present invention is not restricted to this but the display screen turning apparatus may be provided in a display having a display screen (display panel) other than the liquid crystal panel such as an organic EL panel.

While the base 34 is made of sheet metal and the upright portions 34a of the base 34 are integrally formed with the base 34 by partially uprighting the base 34 in the aforementioned embodiment, the present invention is not restricted to this but a base may alternatively be made of resin and the upright portions of the base may be integrally formed with the base when the base is resin-molded.

While the four upright portions 34a of the base 34 are provided at intervals of about 90° along the outer peripheral surface 31a of the turning plate 31 in the aforementioned embodiment, the present invention is not restricted to this but a plurality of the upright portions (the number thereof is four or other than four) of the base may be alternatively provided at an angle other than 90° along the outer peripheral surface of the turning plate.

While the two projecting portions 35e are provided on the both ends of the second planes 35d of the regulating members 35 in the aforementioned embodiment, the present invention is not restricted to this but the number of projection portions provided on portion other than both ends of second planes of regulating members may be alternatively other than two.

While the second planes 35d of the regulating members 35 are bent at an angle of about 90° from the ends of the first planes 35a in the aforementioned embodiment, the present invention is not restricted to this but ends of first planes of regulating members may be alternatively bent downward with prescribed radius to form a U-shape and the bent portions may be elastically deformed.

What is claimed is:

1. A display screen turning apparatus comprising:
a rotating member mounted with a display screen portion and rotatable in a horizontal plane;
a base provided with an upright portion rotatably holding said rotating member and having a first hole;
a regulating member so mounted on said upright portion of said base as to prevent said rotating member from moving upward; and
a stop member formed in a tapered shape by end surface portions, and holding a state where said regulating member is in contact with said rotating member by inserting said stop member into said first hole of said upright portion of said base and pressing said regulating member, wherein
said upright portion is plate shaped including a front wide surface and a rear wide surface which are perpendicular to the thickness direction of said upright portion, and side narrow surfaces parallel to the thickness direction of said upright portion, and said front wide surface of said upright portion perpendicular to the thickness direction of said upright portion comes into contact with an outer peripheral surface of said rotating member.

2. The display screen turning apparatus according to claim 1, wherein
said base is made of sheet metal and said upright portion of said base is formed integrally with said base by partially uprighting said base.

3. The display screen turning apparatus according to claim 1, wherein
a plurality of said upright portions of said base are provided so as to surround said outer peripheral surface of said rotating member so that movement of said rotating member in a horizontal direction can be regulated.

4. The display screen turning apparatus according to claim 1, wherein
a plurality of said upright portions of said base are provided along said outer peripheral surface of said rotating member at substantially equal angular intervals in a plan view.

5. The display screen turning apparatus according to claim 1, further comprising a plurality of slide members formed in a sphere and arranged inside an outer peripheral surface of said rotating member at prescribed intervals, wherein
said upright portion of said base is uprighted from said base toward a rotational center point of said rotating member, and an opening formed in said base by partially uprighting is located outside said outer peripheral surface of said rotating member.

6. The display screen turning apparatus according to claim 1, wherein
said regulating member has a L-shaped longitudinal section by a first surface provided with a first contact portion coming into contact with said rotating member and a second surface provided with a projecting portion, and said base further has a second hole receiving said projecting portion of said regulating member and serving as a supporting point rotatably supporting said regulating member in a vertical direction.

7. The display screen turning apparatus according to claim 6, wherein
said first contact portion of said regulating member is so formed on said first surface as to protrude toward an upper surface of said rotating member.

8. The display screen turning apparatus according to claim 6, wherein
said regulating member further has a second contact portion provided on an end of said second surface and coming into contact with an upper surface of said base when said projecting portion of said regulating member is inserted into said second hole of said base.

9. The display screen turning apparatus according to claim 1, wherein
said stop member is in the form of a plate and receives pressing force of said regulating member with said end surface portions perpendicular to a thickness direction, forming said tapered shape.

10. The display screen turning apparatus according to claim 1, wherein
said stop member is fixed to said first hole of said upright portion of said base with an adhesive.

11. A display screen turning apparatus comprising:
a rotating member mounted with a display screen portion and rotatable in a horizontal plane;
a plurality of slide members formed in a sphere and arranged inside an outer peripheral surface of said rotating member at prescribed intervals;
a base made of sheet metal integrally formed with an upright portion rotatably holding said rotating member and having a first hole by partially uprighting toward a rotational center point of said rotating member and including an opening formed by partially uprighting located outside said outer peripheral surface of said rotating member;
a regulating member so mounted on said upright portion of said base as to prevent said rotating member from moving upward; and
a stop member in the form of a plate, including end surface portions forming a tapered shape, and holding a state where said regulating member is in contact with said rotating member by inserting said stop member into the said first hole of said upright portion of said base and pressing said regulating member, wherein
a side end surface portion in a thickness direction of said upright portion of said base comes into contact with said outer peripheral surface of said rotating member,
said regulating member has a L-shaped longitudinal section by a first surface provided with a first contact portion coming into contact with said rotating member and a second surface provided with a projecting portion, and
said base further has a second hole receiving said projecting portion of said regulating member and serving as a supporting point rotatably supporting said regulating member in a vertical direction, and
said stop member receives pressing force of said regulating member with said end surface portions perpendicular to a thickness direction and is fixed to said first hole of said upright portion of said base with an adhesive.

12. The display screen turning apparatus according to claim 11, wherein
a plurality of said upright portions of said base are so provided as to surround said outer peripheral surface of said rotating member so that movement of said rotating member in a horizontal direction can be regulated.

13. The display screen turning apparatus according to claim 11, wherein a plurality of said upright portions of said base are provided along said outer peripheral surface of said rotating member at substantially equal angular intervals in a plan view.

14. The display screen turning apparatus according to claim 11, wherein said first contact portion of said regulating member is so formed on said first surface as to protrude toward an upper surface of said rotating member.

15. The display screen turning apparatus according to claim 11, wherein said regulating member further has a second contact portion provided on an end of said second surface and coming into contact with an upper surface of said base when said projecting portion of said regulating member is inserted into said second hole of said base.

* * * * *